Sept. 5, 1939.　　　M. BEREK　　　2,171,641
PHOTOGRAPHIC OBJECTIVE
Filed Aug. 5, 1937
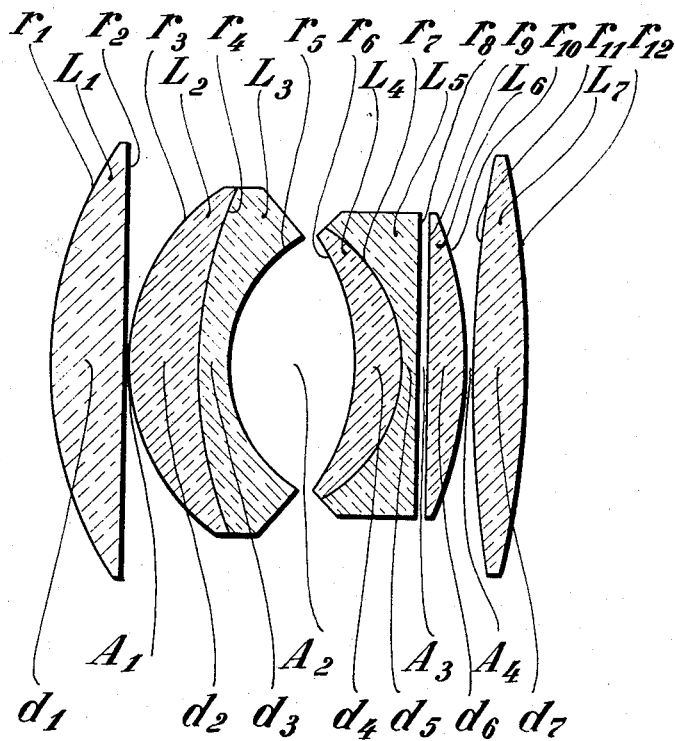
Max Berek INVENTOR Patented Sept. 5, 1939

2,171,641

UNITED STATES PATENT OFFICE 2,171,641

PHOTOGRAPHIC OBJECTIVE

Max Berek, Wetzlar, Germany, assignor to Ernst Leitz, G. m. b. H., Wetzlar, Germany Application August 5, 1937, Serial No. 157,465
In Germany September 2, 1936

1 Claim. (Cl. 88—57)

This invention relates to a type of objective which may best be characterized as a combination of a Gauss objective with a triplets system. As herein disclosed the objective comprises five members: namely, a first collective member, followed by a dispersive meniscus, a biconcave dispersive member and two collective members. The two first members, namely, the collective member followed by the dispersive meniscus, the surfaces of the latter being convex towards the collective member, show the relation to the Gauss objective. The other members, namely, the biconcave dispersive member which is followed by one or two collective members recall in their combination a deviation from the so-called triplets system. Such objectives are known in so far as a strongly dispersive cemented surface is a feature in the dispersive meniscus member. At the same time the biconcave dispersive member includes a collective cemented surface which is strongly concave towards the meniscus. The combination of these two cemented surfaces is selected in order to obtain a satisfactory correction of the spherical aberration in the direction of the optical axis and correction of the coma. However, for this purpose glass bodies having very great differences in the indices of refraction must be cemented together, see German Patent 630,224. In as much as it is an advantage if the surface of incidence of the dispersive meniscus is formed of a glass of high refraction, a lens of low refractive index must be included in this meniscus in order to produce a strongly dispersive cemented surface therein. Usually therefore this meniscus will contain two cemented surfaces one of which is strongly dispersive.

Disclosures by means of which optical defects such as coma and other defects related to the aperture of the lens are eliminated in variations of triplets systems of relative high aperture may be found in British Patent 1991/1893 and particularly in the German Patents 526,307; 526,308; and 585,456. In such cases it is material that a collective cemented surface which is strongly concave toward the object side is included in the biconcave dispersive member. Such an arrangement is utilized in this invention as applied to the aforementioned types of objectives in that such a characteristic cemented surface in the biconcave member is combined with only one cemented surface in the dispersive meniscus, such cemented surface being convex toward the object side. Furthermore, this last mentioned cemented surface must be bent so strongly convex toward the object side that it functions mainly only chromatically. For this purpose it will suffice if the radius of curvature of this surface is within the proportions of one to five of the radius of curvature of the front surface of the meniscus so that the meniscus by means of the cemented surface is divided into two lenses which are strongly meniscus shaped towards the object side. The first of these two lenses is collective and the second one is dispersive. The biconcave dispersive member on the other hand is by means of its collective cemented surface divided in two lenses of which one is meniscus shaped towards the image side and the other is biconcave dispersive. Further, the arrangement of the glass bodies in the two dispersive members is in accordance with the invention such that the collective lens glass body in the dispersive meniscus has a smaller index of refraction but a higher relative chromatic dispersion than the dispersive lens glass body, and that the collective lens glass body in the biconcave dispersive member has a greater refractive index and a higher relative chromatic dispersion than the glass body of the dispersive lens. It is immaterial whether the collective members are simple lenses or contain cemented surfaces. The relative chromatic dispersion is expressed hereinafter by the so-called $\nu$-value or nu-value.

An objective characterized by the aforementioned features and in which the biconcave dispersive member is followed by two collective members possesses the further advantage in that errors of distortion may be easily eliminated if the air space between the biconcave dispersive member and the following collective member is clearly biconvex. By this is meant that the absolute radii of the surfaces which enclose or form said air space are smaller than twenty times the focal length of the entire objective. The air space between the two collective members, in this instance the fourth and the fifth members, must be biconcave.

The object of this invention is to improve objective systems of the character described above whereby to provide an objective system having the characteristics and advantages hereinafter set forth.

The system is illustrated in the accompanying drawing in which the several lenses counting from the front are marked L1, L2, etc. The radii of curvature are marked r1, r2, etc. The spaces between the lenses are marked A1, A2, A3, A4. The axial dimensions are marked d1, d2, etc.

The present invention is embodied in a system which comprises a first collective member, a second dispersive meniscus member, a third biconcave dispersive member and two collective members. The dispersive meniscus (second member) has a dispersive cemented surface convex towards the incident light. The biconcave (third) member has a collective cemented surface concave toward the meniscus. Individually the three first members are constructed as follows.

The difference between the refractive indices at the collective cemented surface in the third biconcave member must be between 0.05 and 0.10. The radius $r7$ of this surface must be at least ⅕ but not more than ½ of the focal length of the system. The curvatures of the exterior surfaces of this member (L4 and L5) must be such that the sum of the reciprocal value of their two radii ($r6$ and $r8$) calculated absolute, lies between treble and quadruple the refractive power of the whole system. The first radius $r1$ must have a value between double and treble the absolute value of said radius $r7$. The radius of $r3$ of the second member must have a value which lies between 1.5 and 2.0 times the absolute value of said radius $r7$.

Finally, the total focal lengths of the first and second members must be positive and between 0.8 and 1.6 of the focal length of the system.

These characteristic values must be embodied according to this invention in systems intended for extremely large apertures for use with a large field as well as for a relatively moderate field.

If the system shall be corrected for a field greater than forty degrees the following additional characteristics must be included. The radius $r6$ in front of the third member must be less than half the focal length of the whole system and the radius $r8$ must be longer than double the focal length of the system.

In such a case two collective members must be placed after the third member, the air lens between said two members being biconcave. The radius $r9$ must have a value at least six times greater than the absolute value of said radius $r7$. The radius $r10$, calculated absolute, must also have a value greater than the absolute value of $r7$, but not more than three times greater.

Finally, each of the radii $r11$ and $r12$ of the last member calculated absolute must lie between 1.5 and 2.0 times the focal length of the system. With the foregoing characteristic values embodied in the system, the latter will consist of five members with a biconvex air space between the second and the third member and the radii of the opposite surfaces limiting said air space, namely $r5$ and $r6$, are each less than half the focal length of the whole system.

If the system shall be corrected for only a moderate field, for instance a field between twenty and thirty degrees the fifth member may be omitted. However, the characteristics of the first three members remain as above described. In addition, the radius $r10$ and the radius $r5$ must each be at least double the absolute value of the said radius $r7$, and the radii $r8$ and $r9$ of the biconvex fourth member calculated absolute, must together have a length of between 0.5 and 1.5 of the focal length of the whole system.

Data of a system with a focal length of 1.000 constructed according to this invention and intended for use with an extremely large aperture and a field greater than forty degrees are given in the following table. The cemented surface in the second member has been introduced for more convenient correction for chromatical aberrations. The radii, thickness and air spaces are given in terms of the focal length of the whole system. The radius is reckoned plus when convex to the incoming light.

| Radii | Lens thickness | Air space | Refractive power |
|---|---|---|---|
| $r1=+0.578$ | $d1=0.108$ | | |
| $r2=+5.24$ | | | $L1=-1.564/61$ |
| $r3=+0.310$ | | $A1=0.003$ | |
| $r4=+0.693$ | $d2=0.108$ | | $L2=-1.620/60$ |
| $r5=+0.218$ | $d3=0.042$ | | $L3=-1.673/32$ |
| $r6=-0.330$ | | $A2=0.193$ | |
| $r7=-0.227$ | $d4=0.069$ | | $L4=-1.592/58$ |
| $r8=+5.71$ | $d5=0.031$ | | $L5=-1.533/49$ |
| $r9=-12.3$ | | $A3=0.008$ | |
| $r10=-0.539$ | $d6=0.058$ | | $L6=-1.620/60$ |
| $r11=+1.101$ | | $A4=0.003$ | |
| $r12=-1.348$ | $d7=0.081$ | | $L7=-1.620/60$ |

The next table contains the "specific powers" of the different surfaces and the Seidel's coefficients are given. A complete explanation of the latter is given in my United States Patent 2,164,028, June 27, 1939, to which reference is made. The table shows the favorable conditions obtained for correction of the spherical aberrations and also for coma, astigmatism, curvature of the field and distortion.

| Number of face | Specific power $\phi$ | Seidel's coefficients | | | | | Δ |
|---|---|---|---|---|---|---|---|
| | | A | B | r | P | | |
| 1 | −0.63 | −1.19 | −0.69 | −0.40 | −0.62 | | −0.59 |
| 2 | −0.25 | −0.22 | −0.32 | −0.46 | −0.07 | | −0.58 |
| 3 | −0.81 | −0.69 | −0.41 | −0.24 | −1.23 | | −0.86 |
| 4 | −0.02 | −0.03 | −0.04 | −0.05 | −0.03 | | −0.02 |
| 5 | −0.97 | −1.17 | −0.98 | −0.82 | −1.85 | | −2.23 |
| 6 | −0.87 | −2.41 | −0.09 | −0.00 | −1.13 | | −0.04 |
| 7 | −0.09 | −0.38 | −0.15 | −0.06 | −0.11 | | −0.06 |
| 8 | −0.10 | −0.01 | −0.04 | −0.30 | −0.06 | | −2.67 |
| 9 | −0.05 | −0.00 | −0.02 | −0.21 | −0.03 | | −2.53 |
| 10 | −0.57 | −0.65 | −0.06 | −0.01 | −0.71 | | −0.07 |
| 11 | −0.03 | −0.00 | −0.01 | −0.29 | −0.35 | | −1.41 |
| 12 | −0.53 | −0.73 | −0.07 | −0.01 | −0.28 | | −0.03 |
| Sum | −1.00 | −0.24 | −0.08 | −0.07 | −0.19 | | −0.07 |

I claim:

A photographic objective system as described intended for large apertures and fields greater than forty degrees, corrected for spherical and chromatical aberrations, also for coma, astigmatism and distortion, comprising five members namely a first collective lens and a second meniscus lens, all of the surfaces thereof being convex towards the incident light, a third biconvex lens, and a fourth and a fifth collective lens; said biconvex lens having a cemented surface of collective power therein concave towards the incident light with a difference between the refractive indices at said cemented surface greater than 0.05 and less than 0.10, the radius of said cemented surface being at least ⅕ but no more than ½ of the focal length of said system; said system being characterized by that the first surface therein is curved about a radius the value of which lies between double and treble the absolute value of said cemented surface radius; the third surface in said system being curved about a radius the value of which lies between 1.3 and 2.0 of the absolute value of said cemented surface radius; the total focal lengths of said first and second members being positive and between 0.8 and 1.6 of the focal length of said system; the air separation between said second and third members forming a biconvex air lens with radii of curvature each of which is less than one half the focal length of the system; the rear radius of said third member being greater than double the focal length of the system; the sum of the absolute values of the exterior radii of said third member being at least treble and no more than quadruple the reciprocal length of the system; the front surface of said fourth member having a radius at least six times greater than the absolute value of said cemented surface radius; the rear radius of said fourth member being absolutely greater but not more than treble said cemented surface radius; the fifth member having radii each of which is at least 1.5 and no more than 2.0 of the focal length of the whole system.

MAX BEREK.